United States Patent [19]

Mis

[11] Patent Number: 4,597,118
[45] Date of Patent: Jul. 1, 1986

[54] COMBINED BED FRAME AND BOX SPRING ASSEMBLY

[76] Inventor: Frank J. Mis, 9601 S. Robertson, Oak Lawn, Ill. 60453

[21] Appl. No.: 615,567

[22] Filed: May 31, 1984

[51] Int. Cl.$^4$ .................... A47C 23/04; A47C 19/00
[52] U.S. Cl. ...................................... 5/246; 5/200 R; 5/248; 5/279 C; 403/230; 403/232.1; 403/241
[58] Field of Search ............ 5/236 R, 239, 241, 245, 5/246, 247, 248, 279 B, 279 C, 200 R; 403/230, 241, 232.1

[56] References Cited

U.S. PATENT DOCUMENTS

| 2,610,335 | 9/1952 | Baptista | 5/248 |
| 3,950,797 | 4/1976 | Bronstien | 5/200 R |
| 4,507,815 | 4/1985 | Danko | 5/282 R |

FOREIGN PATENT DOCUMENTS

| 617732 | 4/1961 | Canada | 5/248 |
| 1009518 | 5/1952 | France | 5/200 R |

Primary Examiner—Alexander Grosz
Attorney, Agent, or Firm—John J. Kowalik

[57] ABSTRACT

A bed spring assembly and a supporting rectangular steel frame structure incorporating leg supports, the frame structure including cross beams which in certain embodiments are prestressed in tension or compression to obtain maximum load support without sagging and wherein the springs of the spring assembly are directly fastened to hooks or eyes formed on the cross beams. The invention also discloses round and square corner frame constructions and an attachment if the spring assembly upholstery to either metal frame by providing a hem with a wire threaded therein in the lower edge portion of the skirt of the fabric and pinning the edge portion about the wire to the metal frame or in another embodiment by providing flanges about the lower edge of the frame to which the fabric is clamped.

8 Claims, 29 Drawing Figures

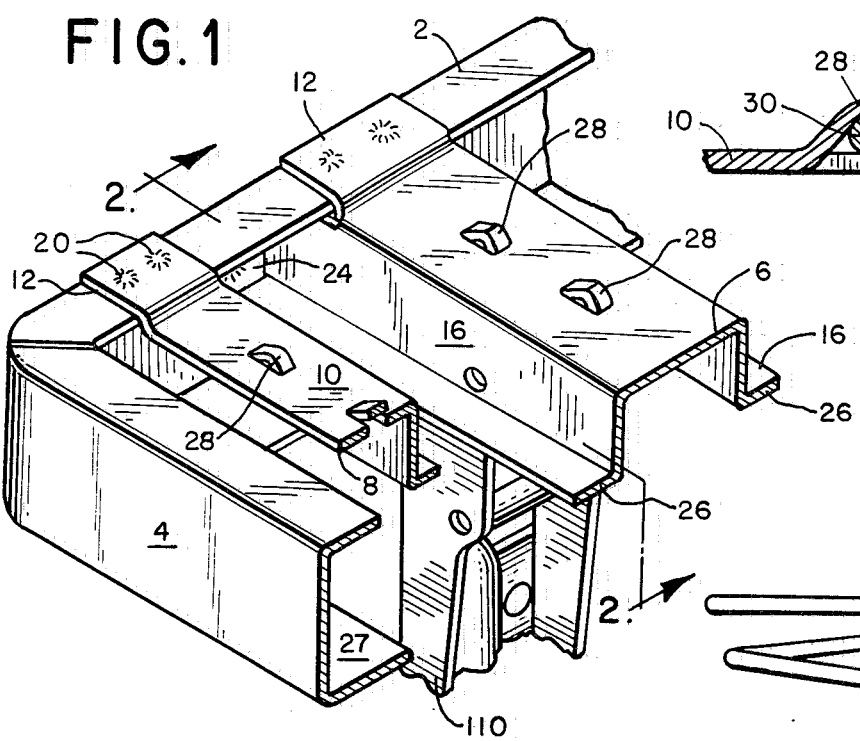
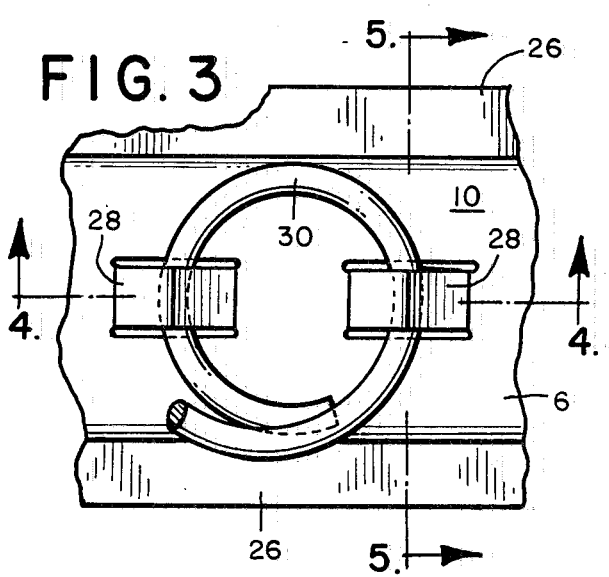
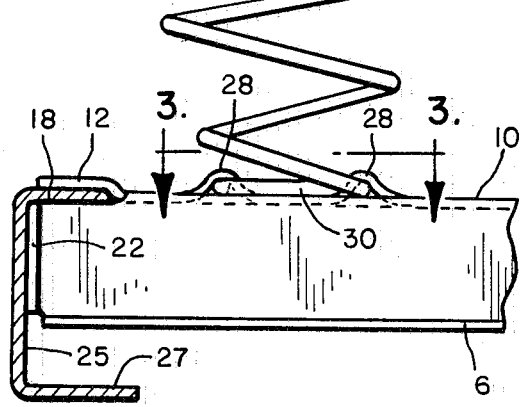
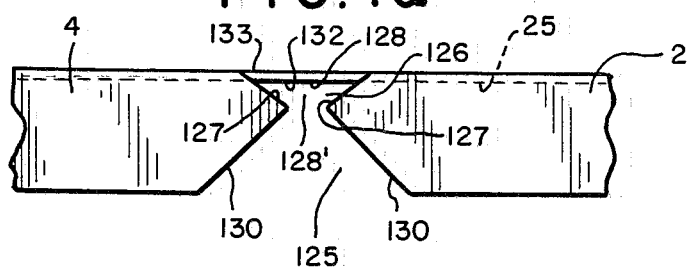
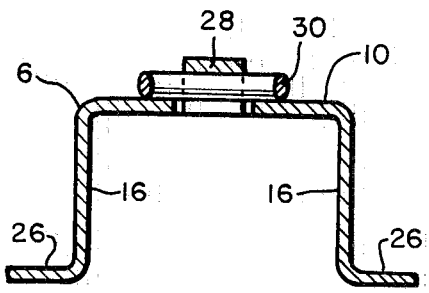

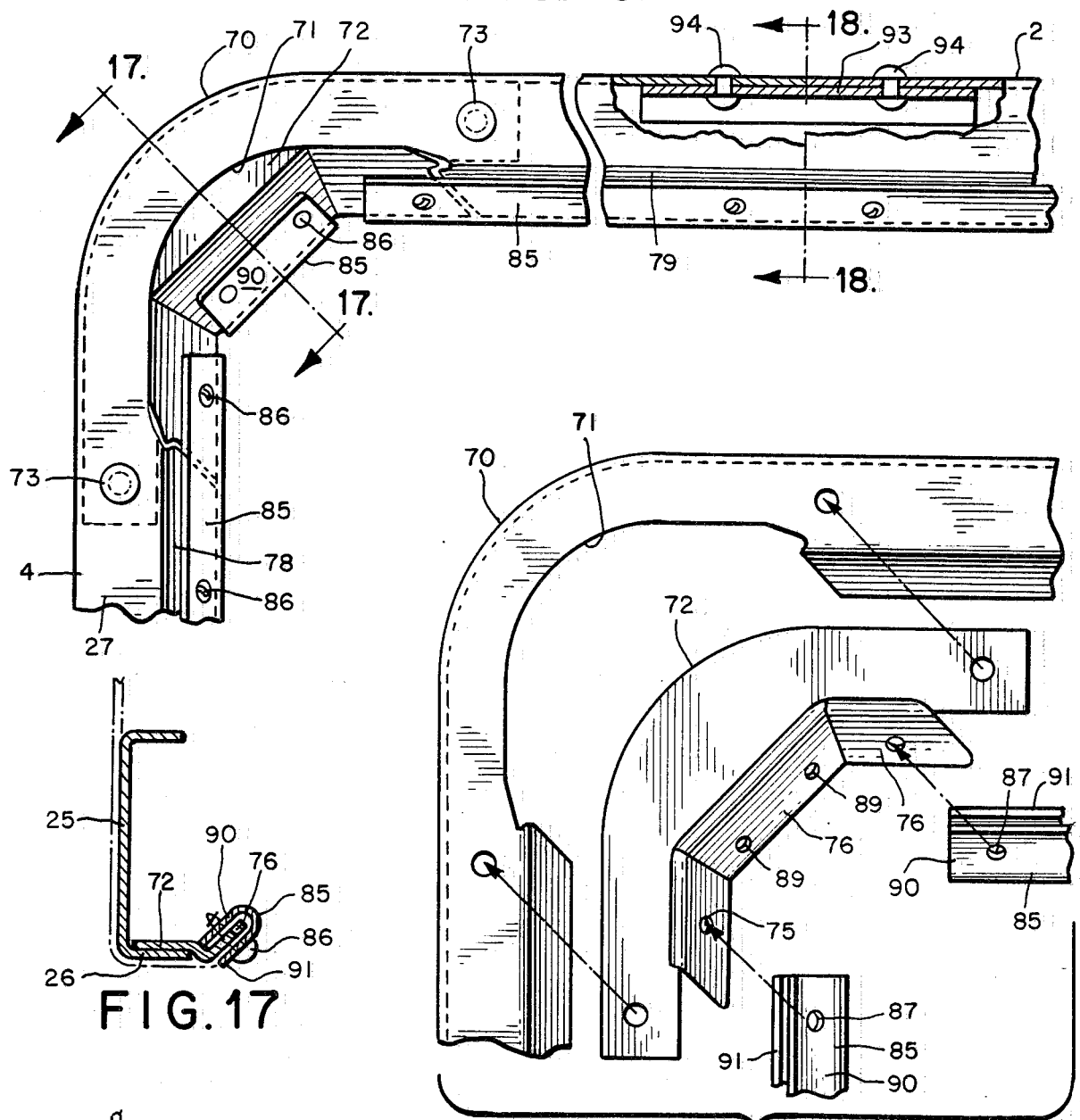
FIG. 15
FIG. 16
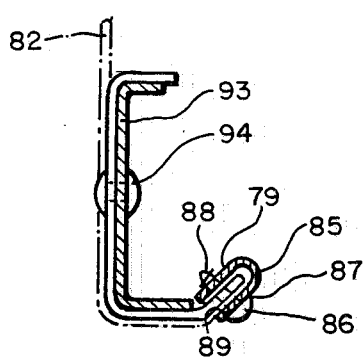
FIG. 17
FIG. 18
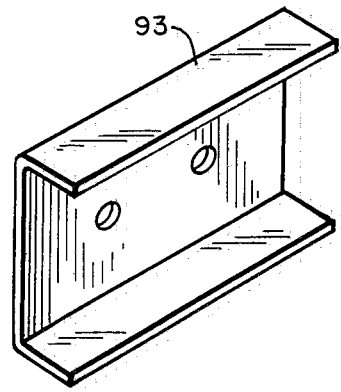
FIG. 19

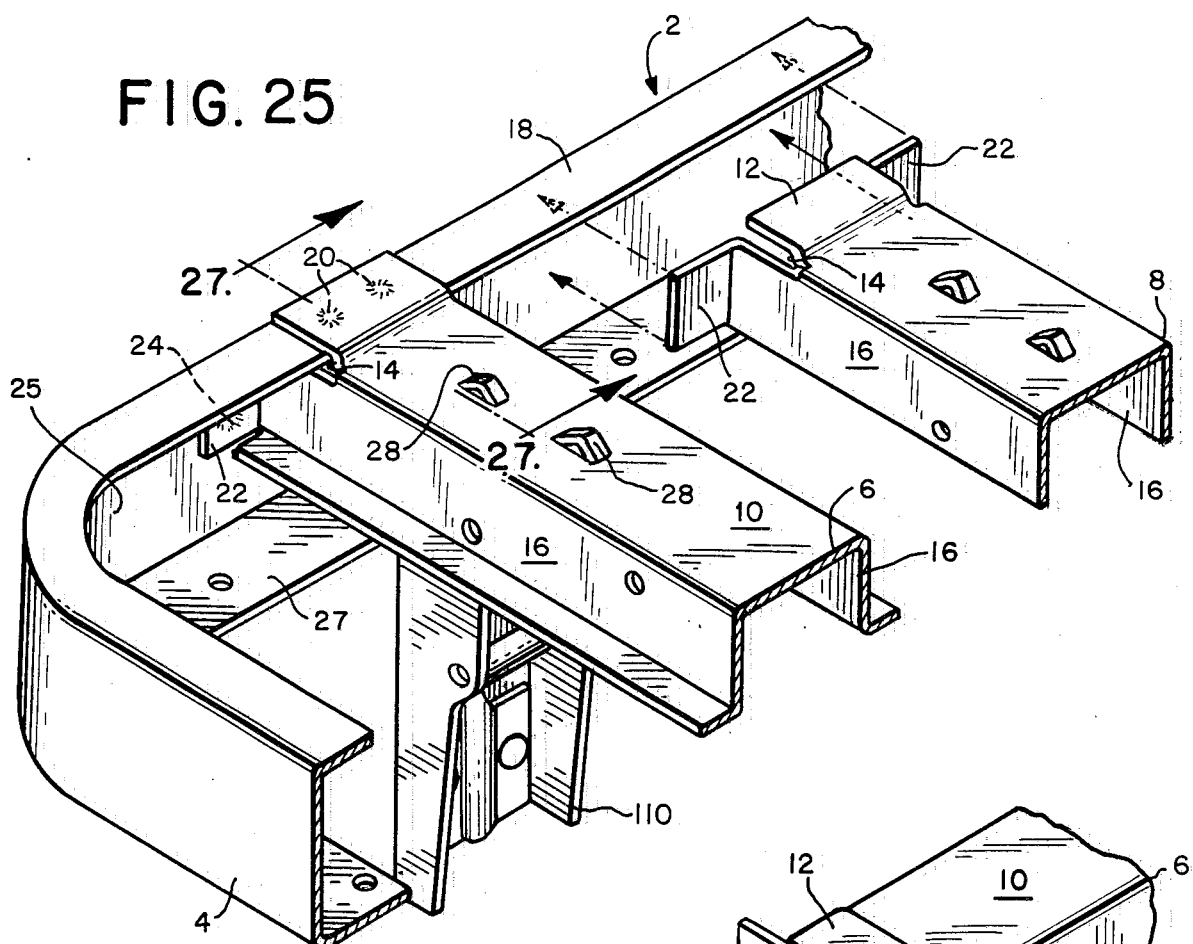
FIG. 25
FIG. 27
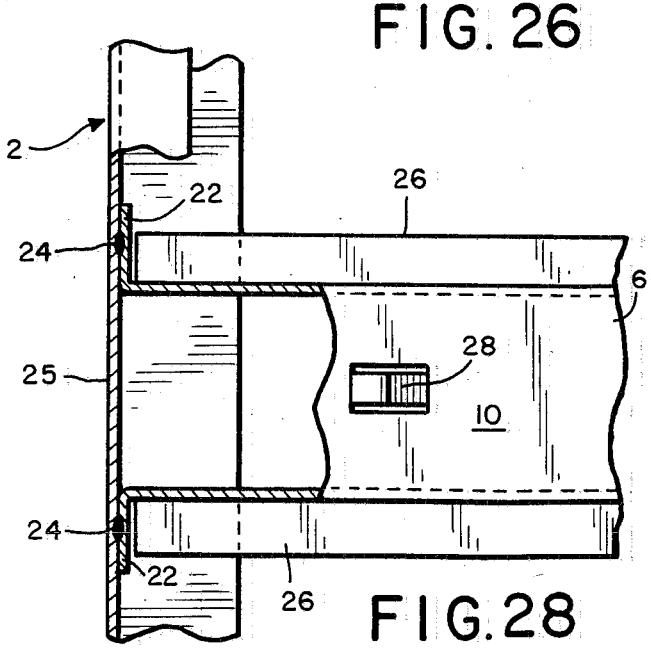
FIG. 26
FIG. 28

COMBINED BED FRAME AND BOX SPRING ASSEMBLY

BACKGROUND OF THE INVENTION

This invention appertains to be structures which heretofore comprised a separate bed frame and a box spring. The frame usually consisted of a pair of side rails and interconnecting cross members, which in some models were adjustable to accommodate bed springs, also known as box springs, of various dimesions. The box springs were made with wooden rectangular frames and the fabric covering the springs was tacked to the wooden frame. The springs were fastened in various ways to wooden slats which extended transversely to the longitudinal side members of the frame.

SUMMARY OF THE INVENTION

This invention relates to beds in which the bed frame and the box spring are integrated as a single unit.

A further object is to provide a novel all metal bed construction in which the cross beams are provided as channel members with a top wall formed with an upwardly offset tab at each end which overlaps a horizontal top wall of a channel side frame member and is welded thereto and wherein a pair of vertical side walls of each channel are formed with lateral tabs at each end each weld-connected to a vertical web of a side frame member and wherein the top wall of each cross-member is provided with anchors sheared from the top wall for securing the bottom ends of the springs of a box spring.

Another object is to fabricate a minimum weight frame in which the cross members are stress loaded in tension in one of the embodiments and in another certain high load carrying members are loaded in compression and also serve as leg supports for the bed.

The invention also comprehends a novel bed construction in which the spring-covering upholstery fabric is secured to the integrated bed frame and spring assembly in a novel manner.

A further object is to provide a bed structure which can be constructed either with a square or rounded corner and in which the rounded corner is cut out to facilitate forming and a filler bracket is provided attachable to the interior of the corner to provide an attachment for the spring upholstery encompassing the corner.

Another object is to provide the transverse members of the combined bed and spring frame with means for attaching the bed springs so that the spring assembly and frame become a unitary structure after fabrication.

These and other objects and inventions inherent in the disclosure and encompassed by the invention will become more apparent from the specification and the drawings, wherein:

FIG. 1 is a fragmentary perspective view of a corner of one form of my novel frame assembly;

FIG. 1a top view of a portion of a preform showing the corner formation prior to forming;

FIG. 2 is a cross sectional view and on a smaller scale taken generally on line 2—2 of FIG. 1 showing one form of spring coil mounting;

FIG. 3 is a fragmentary top view of FIG. 2 on an enlarged scale;

FIG. 4 is a section taken substantially on line 4—4 of FIG. 3;

FIG. 5 is a cross section on line 4—4 of FIG. 3;

FIG. 15 is a fragmentary view of one corner partly in section of one of the embodiments;

FIG. 16 is an enlarged exploded view of the structure shown in FIG. 15;

FIG. 17 is a cross section taken substantially on line 17—17 of FIG. 15;

FIG. 18 is a cross section taken substantially on line 18—18 of FIG. 15;

FIG. 19 is a perspective view of one of the strengthening brackets;

FIG. 25 is a fragmentary perspective of another embodiment of the frame;

FIG. 26 is a fragmentary end view of one end of one of the cross members in FIG. 25 shown in perspective;

FIG. 27 is a cross-section taken on line 27—27 of FIG. 25; and

FIG. 28 is a top view of a portion of the frame partially in horizontal section taken substantially on line 28—28 of FIG. 27.

DESCRIPTION OF THE INVENTION

Figure 6:
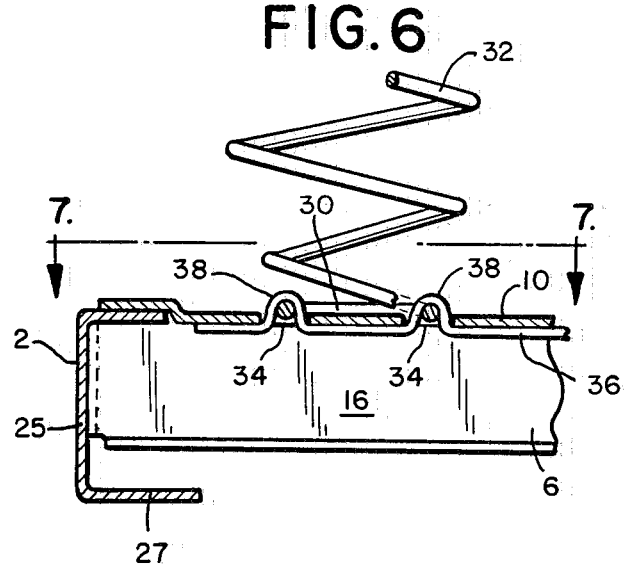
FIG. 6 is a section similar to FIG. 2 showing a different spring attachment.

Describing the invention in detail, and having particular reference to the drawings, the bed and spring assembly generally designated 1 comprises a rectangular frame made as a steel structure and having channel shaped side rail members 2,2 and end beam members 4,4 also of channel shape welded or formed into a unitary structure.

There are provided a pair of channel shaped leg and spring support beams 6,6 adjacent each end of the frame and a plurality of lighter spring-mounting channel shaped beams 8,8. The beams 6 and 8 interconnect the side rails and at each end have their top wall 10 offset upwardly to form a tab 12 and a slot 14 therebeneath with the upper edges of its side walls 16,16. The slot 14 admits the top web 18 of the adjacent side rail therein and the tab 12 overlaps the same and is spot welded thereto as at 20,20. Each end of each side wall 16 is formed with a laterally extending lug 22 which is spot welded at 24 to the vertical wall 25 of the side rail. The lower edges of the main beams 6 have outturned flanges 26,26 which are spaced above a lower wall 27 of the respective side rail.

Each beam 6 and 8 is formed on its top wall 10 with spring retainers 28,28 which are shear formed and punch shaped from the cut out material. These retainers are arranged in pairs and the bottom coil 30 of the bed spring 32 is threaded therethrough and is thus retained. If required, the retainers may then be struck by a punch after the coil is inserted so as to clinch the coil and hold it securely in place.

Figure 7:
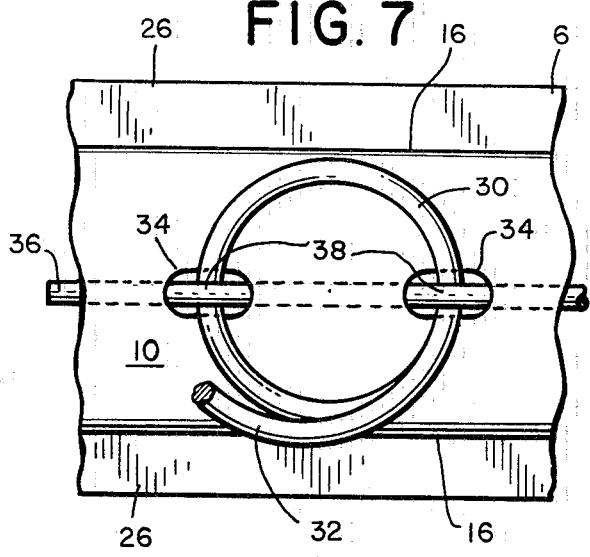
FIG. 7 is a fragmentary top view of FIG. 6.

FIGS. 6 and 7 show an alternative method of securing the springs. In this embodiment the top wall of each beam 8 has a series of holes 34 punched therethrough and a securing wire 36 is placed beneath the beam 6 with a series of loops 38 which are passed through adjacent loops to secure the spring to the beam. It is also preferred that the beams 6 be similarly apertured and wired to hold the spring seated thereon.

Figure 8:
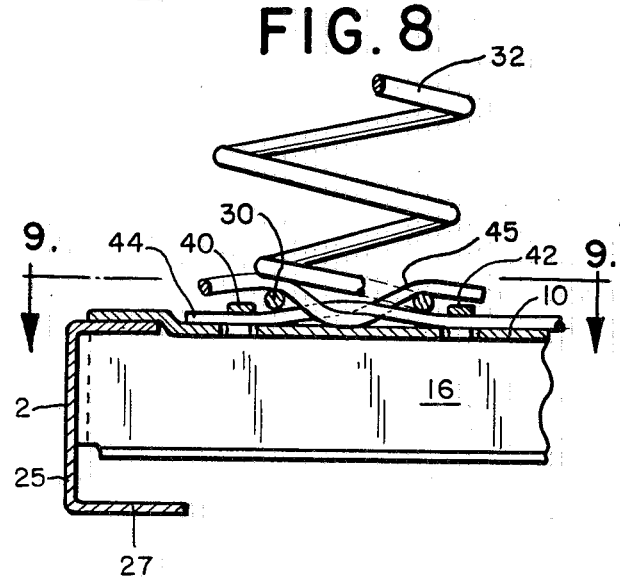
FIG. 8 is a section similar to FIG. 6 showing another spring attachment.
Figure 9:
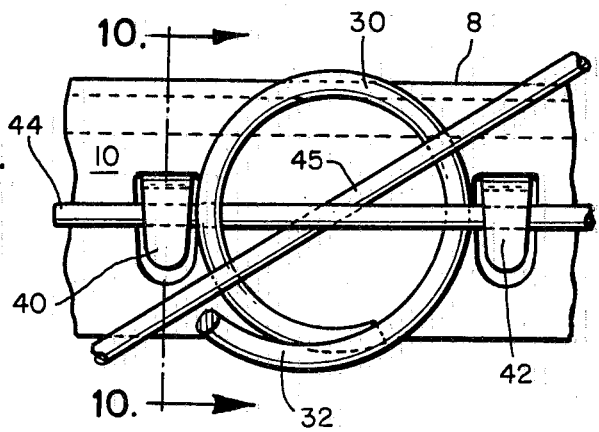
FIG. 9 is a fragmentary top plan view of FIG. 8.

In FIGS. 8 and 9 the top wall 10 of each beam 6 and 8 is sheared to form pairs of anchor hooks 40,42 and a wire 44 is passed diametrically under the bottom coil 30 of spring 32 and over a diagonally arranged wire 45 which extends over diametrically opposite side of the bottom coil 30. The anchors are bent down toward wall 10 to hold the wire 44 which extends lenghtwise of the beam tightly over the coil tightly over the coil securing wire 45 which extends transversely over a plurality of beams.

Figure 10:
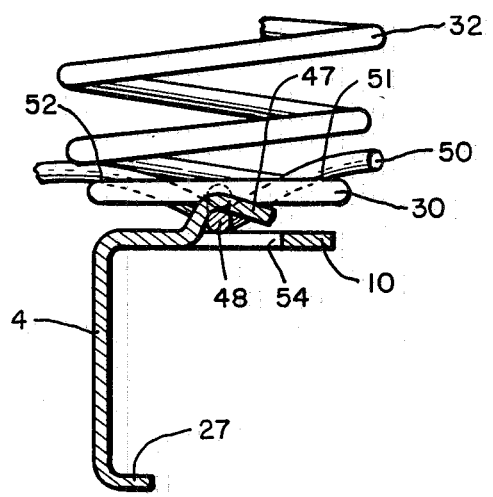
FIG. 10 is a cross section taken on line 10—10 of FIG. 9.
Figure 11:
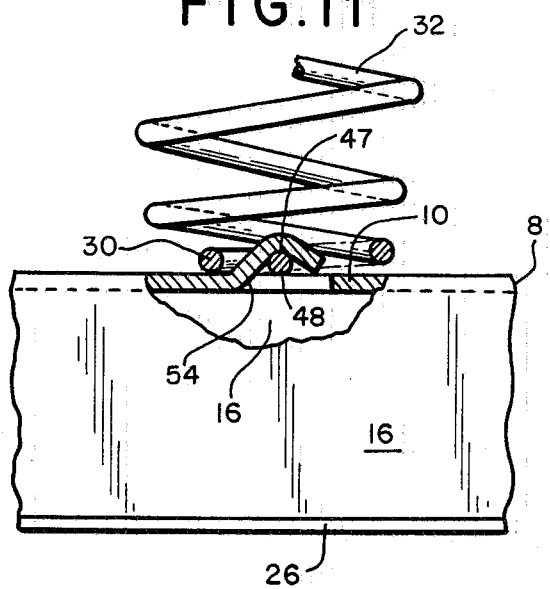
FIG. 11 is a section similar to FIG. 10 showing another form of spring attachment.

FIGS. 10 and 11 illustrate another method of fastening the springs to the frame members. In this embodiment hooks 47 are formed in the top wall 10 and extend lengthwise of the beam and the spring 32 has its end coil 30 formed with a diametrically extending end portion or tail 48 which extends over a longitudinally extending wire 50 which is looped over diametrically opposides 51,52 of the coil 30, the end portion 48 extending under a hook or anchor 47 which bridges the opening 54 which was formed when the hook was sheared from the top wall 10. The hook may then be bent over to tighten its grasp on the tail 48.

FIG. 11 is essentially the same as FIG. 10 except that the wire 50 is eliminated and the coil 30 seats on the top wall of the beam and the end 48 extends directly under the hook 47.

Figure 12:
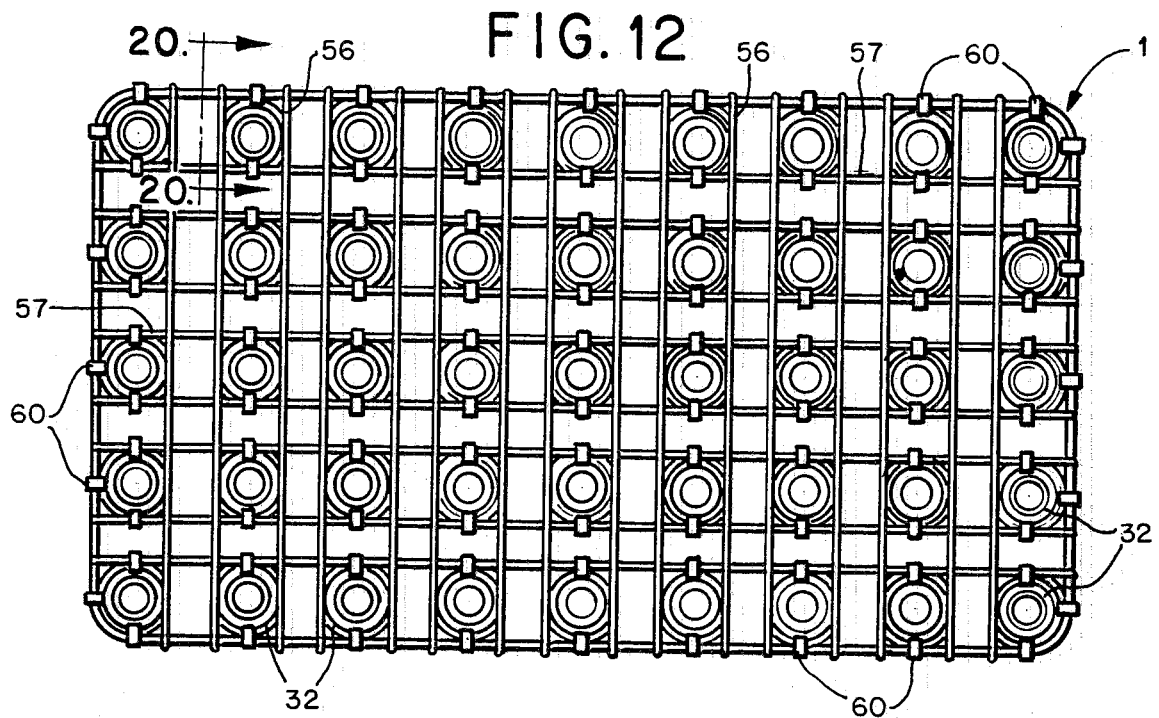
FIG. 12 is a top view of a spring and bed assembly without the upholstery fabric.
Figure 13:
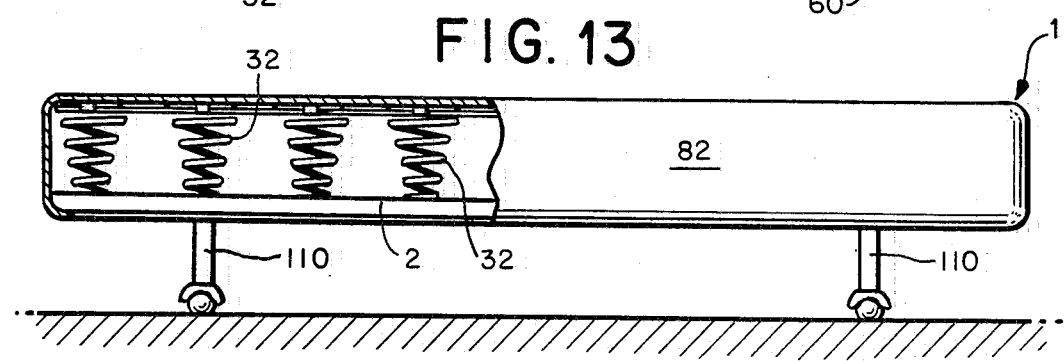
FIG. 13 is a side elevational view of the structure shown in FIG. 12 with the fabric applied thereto and partly broken away.
Figure 14:
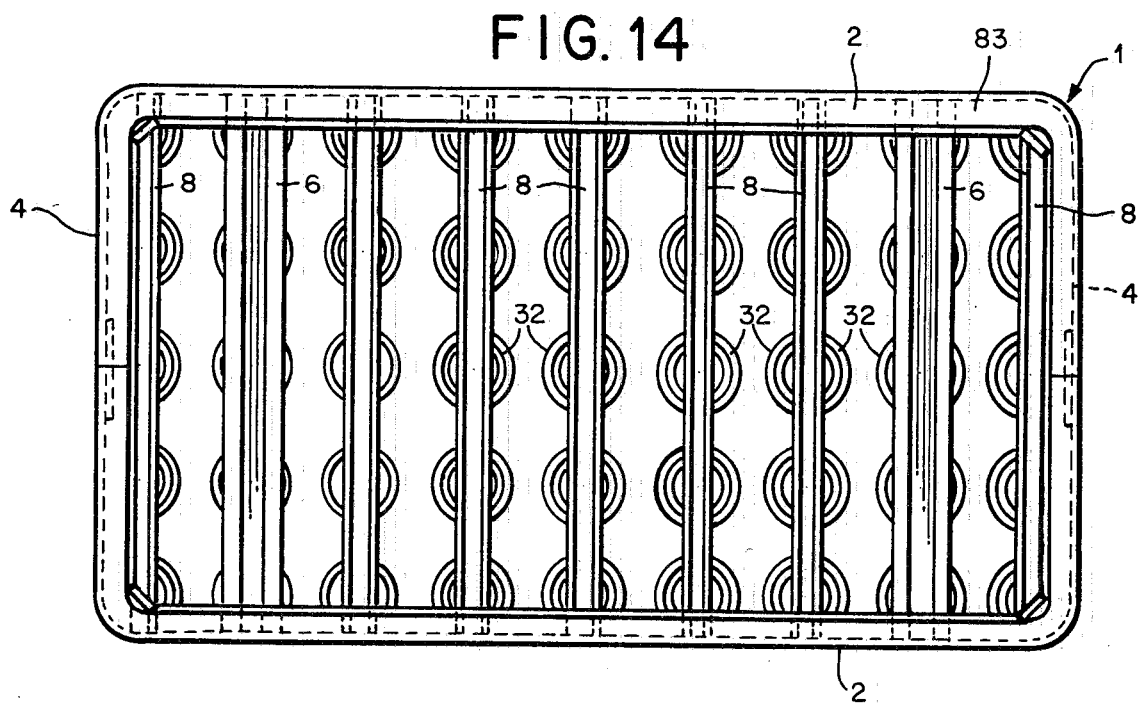
FIG. 14 is a bottom plan view of the assembly.

As best seen in FIGS. 12—14 the bed springs are tied together by a series of cross wires 56,57 which attach to the border wire and the upper ends of the springs are attached to the grid of wires 56,57 and the border springs are also attached to the border wire as at 60,60.

It will be noted that the cross members are of channel shape but may be of Z shape at the opposite ends of the bed as shown in the later figures.

FIG. 15 shows a rounded corner construction 70 of the frame wherein the lower web 27 of the juncture of the end beam member and the side member are formed with a cutout 71 to about one half of its original width to provide a U-shaped notch to facilitate bending of the preform to form the corner. A U-shaped bracket 72 with three angularly related straight lip portions on its inner edge spans the notch 71 and has the legs at its opposite ends secured as by rivets 73,73 to the side and end members. The inwardly angled lip portions or flanges are indicated at 75,76, and 77. Flanges 75,77 on the ends of the bracket align with similar flanges 78 and 79 formed respectively on the bottom walls 27 of the end and side members of the frame. The center flange 76 on the bracket subtends the respective corner.

Figure 20:
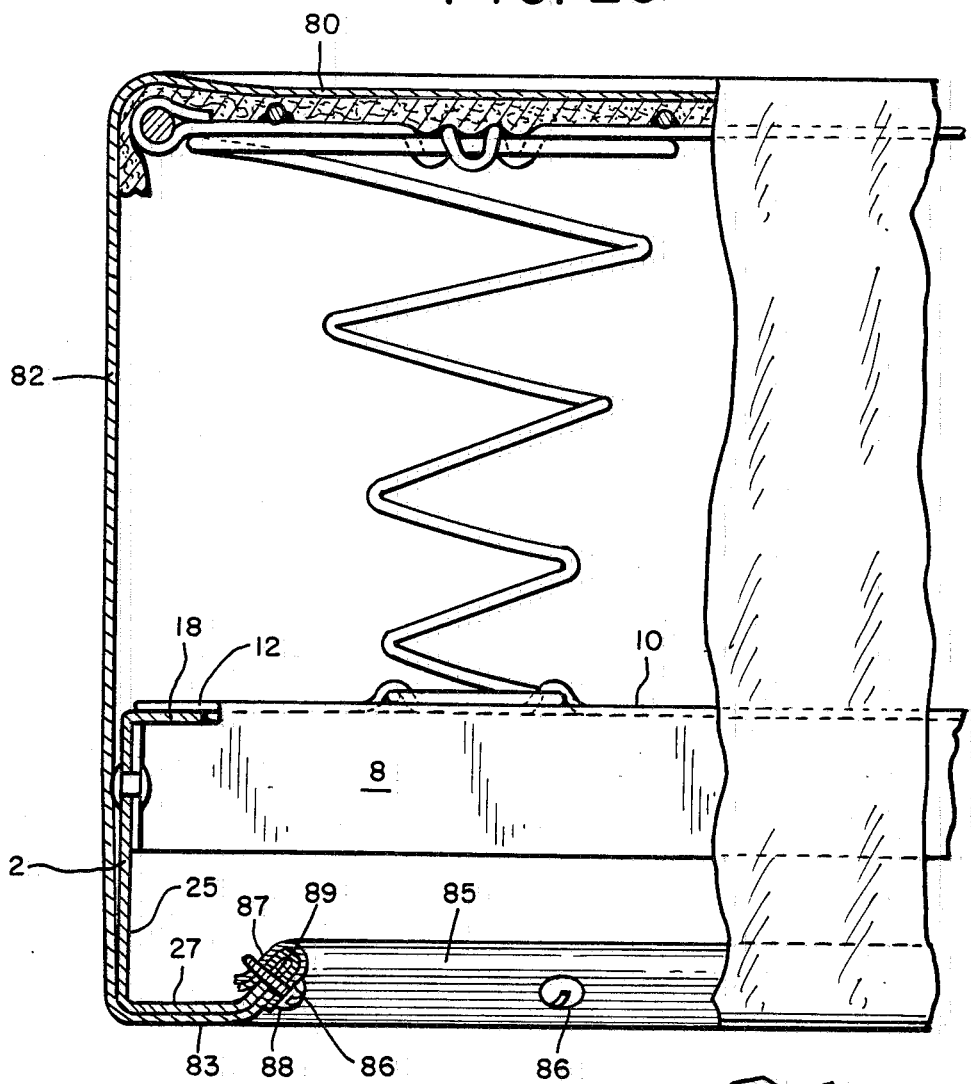
FIG. 20 is a fragmentary vertical cross-section of another embodiment of a bed frame and spring assembly.

A spring covering fabric or upholstery is provided to cover the springs and has a top panel 80 with a pad therebeneath and a side panel or skirt 82 which extends about the sides and ends of the spring assembly. The lower edge portion 83 of the skirt 82 is wrapped under the lower wall 27 of the frame and is flapped over the upper edges of the fabric-securing flanges 75 through 79 and a series of U-shaped clamps or clips 85,85 are clamped over the fabric with the respective securing flange therebetween. Self tapping screws 86,86 are threaded through aligned openings 87,88,89 in the jaws 90,91 of the clamps and in the associated securing upturned flanges of the frame members as best seen in FIG. 20.

A series of U-shaped reinforcing insets 93 may be riveted as at 94 to the walls of the side members adjacent to each corner.

Figure 22:
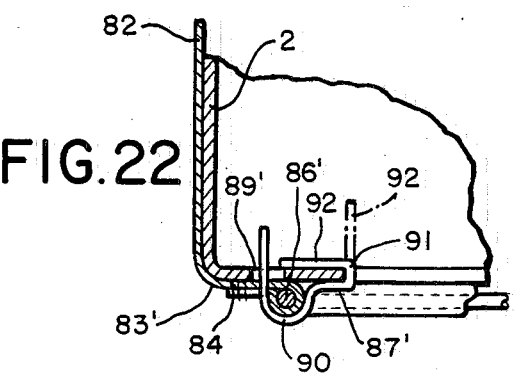
FIG. 22 is a cross section taken substantially on line 22—22 of FIG. 21.
Figure 21:
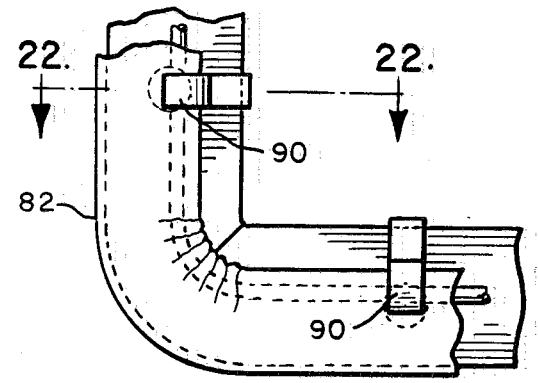
FIG. 21 is a fragmentary bottom view of one corner of a bed and spring frame assembly showing one form of fabric attachment.
Figure 23:
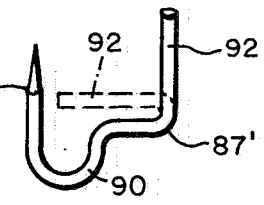
FIG. 23 is a side elevational view of one form of attachment arrangement.

FIGS. 21,22 and 23 illustrate another form of attachment of the spring covering fabric to a square corner bed frame. This securement may also be used for a rounded corner frame with appropriate modifications of the frame. The lower edge portion 83' of the skirt 82 is hemmed at 84 to provide a passage for a wire 86'. A securing clip 87' shown in FIGS. 21 and 22 has a sharp end portion 88' which is caused to pierce through the cloth 83' and extend through an opening 89' provided at spaced intervals in the lower wall 27 of the frame. The portion 88' is positioned outwardly of the wire 86' and the pin 87' has a bottom portion 90 looped under the wire and extending beneath the hem and the wire to the inner edge 91 of the lower wall 27 and joins a bendable securing portion 92 which is bent over edge 91 and against the top side of the wall 27. It will be noted that there are a series of such clamps or pins positioned about the periphery of the lower edge portion of the skirt fabric and are secured to the frame in the manner heretofore described.

In FIG. 23 the securing device is shown in side elevation before bending and is shown bent in dotted lines.

Figure 24:
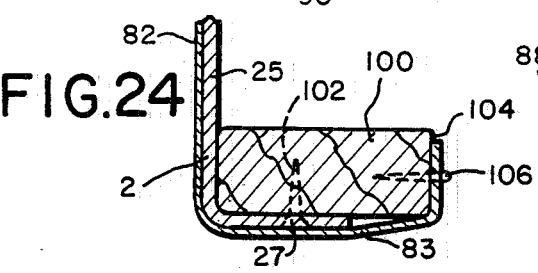
FIG. 24 is a view similar to FIG. 22 showing a wood strip mounted in the metal frame and a staple attachment of the fabric.

FIG. 24 shows a further embodiment in which a wooden securing piece or strip 100 is used. It comprises a long strip positioned on the bottom wall of each end and side member and is fastened thereto as by nails 102 which extend from below wall 27 through opening therein. The lower edge portion 83 of the skirt is brought under the lower wall 27 of the bed frame members and against the inner edge 104 of the wooden strip and is tacked thereto along its length as at 106.

FIG. 25-28 illustrate the construction of another embodiment of the bed frame which is used in combination with a spring assembly, as aforesaid and with the fabric and fasteners. As best seen in FIG. 25 the leg support beam 6 is connected to a leg 110 which is more adequately shown in my companion application filed concurrently herewith and described therein Ser. No. 615,569.

The attachment of the side rails and beams 6 and 8 is shown in detail whereat the parts are so fabricated as to be easily assembled in a robotic line and weld-connected to each other with minimum human handling. The various beams are strategically located and designed to carry optimum loads with minimum weight and materials. As best seen in FIG. 1a, the portions 2 and 4 of the preform which eventually form the side rails and end members are sheared in their top and bottom walls to provide reversely facing end to end interconnected trapezoidal notches, viz. an inner notch 125 and an outer notch 126. The smaller outer notch has its base edge 128 aligned with the inner side of the verical wall 25 and also has side edges of slightly covex contours at 127,127 converging toward the opening 128' which connects the inner end of the outer notch 126 with the outer end of the inner notch 125, the straight sides of which diverge toward the inner edges of the top or bottom walls. The portions 2 and 4 are bent in a suitable jig and the edges 127,127 of each notch of each notch 126 then lay against the edge 132 of the extension portion 133 of the vertical wall 25 and simultaneously the straight edges 130,130 are brought into abutment with each other as seen in FIG. 1. If desired all of the abutting edges may be welded to each other.

The invention also comprehends assembling all of the cross members under a tension load between the side rails. In other words these beams are made slightly shorter than the space between the opposing vertical wall 25 of the opposed side rails. When the frame is placed in a jig with the cross members positioned between the side rails 2,2, the rails are sprung toward each other against the ends of the cross beams which are then welded to the side members. The side rails are then released and tend to spring outwardly thus imposing a tensile load on the cross members. This feature allows the use of simple light weight spring-support beams which are precluded from sagging when the springs are loaded.

The invention also contemplates loading the leg-support beams in compression. These leg support beams are made larger and stronger than the spring support beams and slightly longer than the latter. Thus when this assembly is placed in a suitable jig and a load is applied against the side rails springing them toward each other, the leg support beams will be slightly compressed when the side rails make contact with the ends of the spring support beams which are of lighter construction. The parts are welded to each other, namely the beams ends are welded to the side rails. Thereupon the side rails are released and in springing back will load the spring support beams in tension, however, the leg supporting beams will remain in compression.

As a further concept the invention also embodies a structure wherein all of the cross beams are fabricated to fit snugly to the side rails and are welded thereto without imposing and prestressing load on any of the beams.

I claim:

1. A combined bed spring and frame assembly comprising a metal frame having end and side beams integrated into a generally quadrilateral structure having a generally horizontal top wall,
    a plurality of transverse bed-spring mounting and supporting beam members extending between said side beams and connected at their ends thereto,
    a pair of transverse leg support beam members extending between and connected at opposite ends to said side beams,
    each of said transverse beam members having vertical side wall means and a top web with an end portion comprising an upwardly offset tab,
    said side wall means having upper edges spaced vertically below said tab and defining a horizontal slot therewith snugly admitting a portion of the top wall of the adjacent side beam therein between said upper edges and said tab,
    and means weld-connecting the tab to said portion of the adjacent side beam.

2. The invention according to claim 1 and said transverse beam members each comprising laterally extending tabs on said wall means thereof weld connected to the respective side beams and said tab on said end portions extending longitudinally of the respective beam member.

3. The invention according to claim 2 and said leg support beam members being loaded in compression and providing bed-supporting leg mountings and being of greater depth and width that the other transverse beam members.

4. A combined bed spring and frame assembly comprising a metal frame having end and side beams integrated into a generally quadrilateral structure having a generally horizontal top wall,
    a plurality of transverse bed spring mounting and supporting beam members extending between said side beams and connected at opposite ends to said side beams,
    a pair of transverse leg support beam members extending between and connected at opposite ends to said side beams,
    each of said transverse beam members having a top web with an end portion comprising an upwardly offset tab defining a horizontal slot therebeneath admitting a portion of the top wall of the adjacent side beam therein,
    means weld-connecting the tab to said portion of the adjacent side beam, each said transverse beam member having side walls with laterally extending lugs at each end,
    each side beam having a vertical wall,
    and means weld-connecting each lug to the vertical wall of the adjacent side beam.

5. The invention according to claim 4 and said top wall of each of said beam members comprising spring-mounting and securing means.

6. The invention according to claim 5 and a bed spring assembly supported upon said beam members and having springs secured to respective spring-mounting and securing means on said members.

7. The invention according to claim 6 and a fabric covering said spring assembly and comprising a portion underlapped with respect to said side and end beams,
    and means for fastening said fabric portion to said side and end beams.

8. The invention according to claim 7 and said side and end beams having a bottom horizontal wall and said fastening means comprising an upturned lip on said bottom wall and said fabric overlapping the lip and a clip embracing said overlapping portion of said fabric and clasping it against opposite sides of the lip, and securing means extending through the lip and the overlapped portion of the fabric and the clip.

* * * * *